United States Patent
Tajima et al.

(10) Patent No.: US 8,035,554 B2
(45) Date of Patent: Oct. 11, 2011

(54) DEVICE FOR MEASURING A POSITION OF A MOBILE STATION

(75) Inventors: Yasuhiro Tajima, Toyota (JP); Naoto Hasegawa, Toyota (JP); Akihiro Ueda, Toyota (JP); Kiyomi Nagamiya, Nissin (JP); Mitsuru Nakamura, Kasugai (JP); Naoto Shibata, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 232 days.

(21) Appl. No.: 12/515,540

(22) PCT Filed: Nov. 13, 2007

(86) PCT No.: PCT/JP2007/071999

§ 371 (c)(1),
(2), (4) Date: May 20, 2009

(87) PCT Pub. No.: WO2008/062692

PCT Pub. Date: May 29, 2008

(65) Prior Publication Data

US 2010/0048140 A1   Feb. 25, 2010

(30) Foreign Application Priority Data

Nov. 20, 2006   (JP) .................. 2006-313434

(51) Int. Cl.
  *G01S 19/48*   (2010.01)
  *H04B 17/00*   (2006.01)
(52) U.S. Cl. ................. 342/357.31; 455/67.11
(58) Field of Classification Search ............ 342/357.31; 455/67.11
See application file for complete search history.

(56) References Cited

U.S. PATENT DOCUMENTS

| 7,298,289 | B1* | 11/2007 | Hoffberg | 340/903 |
| 2002/0049530 | A1* | 4/2002 | Poropat | 701/207 |
| 2002/0198632 | A1* | 12/2002 | Breed et al. | 701/1 |
| 2006/0106533 | A1* | 5/2006 | Hirokawa | 701/207 |
| 2007/0057839 | A1* | 3/2007 | Kagawa | 342/357.04 |

FOREIGN PATENT DOCUMENTS

| JP | 57 14711 | 1/1982 |
| JP | 9 196691 | 7/1997 |
| JP | 10 153442 | 6/1998 |
| JP | 10-153442 A * | 6/1998 |

(Continued)

*Primary Examiner* — Thomas H. Tarcza
*Assistant Examiner* — Frank McGue
(74) *Attorney, Agent, or Firm* — Oblon, Spivak, McClelland, Maier & Neustadt, L.L.P.

(57) ABSTRACT

A device for measuring a position of a mobile station according to the present invention comprises: first measuring means for measuring the position of the mobile station based on observed data of signals from satellites using a one-epoch measuring method; second measuring means for measuring the position of the mobile station using previous determination result of the position of the mobile station and speed information representative of a speed of the mobile station; third measuring means for measuring the position of the mobile station using solutions of variables derived from previous determination results of the first or second measuring means; and controlling means 60 for selecting one of the respective measuring means which is to execute its measuring process; wherein if reliability of the determination result of the selected measuring means is lower than a predetermined reference value, the controlling means selects another measuring means to make it execute its measuring process.

10 Claims, 7 Drawing Sheets

FOREIGN PATENT DOCUMENTS

| | | | |
|---|---|---|---|
| JP | 2001 99910 | | 4/2001 |
| JP | 2001 099910 A | * | 4/2001 |
| JP | 2005 164395 | | 6/2005 |
| JP | 2005 164395 A | * | 6/2005 |
| JP | 2006 3208 | | 1/2006 |
| JP | 2006 98246 | | 4/2006 |

* cited by examiner

DEVICE FOR MEASURING A POSITION OF A MOBILE STATION

TECHNICAL FIELD

The present invention relates to a device for measuring a position of a mobile station using a plurality of items of measuring means.

BACKGROUND ART

JP 2006-98246 A discloses a vehicle position measuring device comprising GPS receiving means for receiving GPS signals, first calculating means for calculating a first position of the vehicle based on the GPS signals, travel distance detecting means for detecting a travel distance of the vehicle, direction detecting means for detecting a traveling direction of the vehicle and second calculating means for calculating a second position of the vehicle based the travel distance detected by the travel distance detecting means and the traveling direction detected by the direction detecting means, wherein said device further comprises determining means for determining the reliability of the first position of the vehicle, and said device corrects the second position of the vehicle by the first position of the vehicle considering the reliability determined by the determining means and a calculation time of the first calculating means.

By the way, various ways of measuring the position of the mobile station using the signals from the satellites, INS sensor, etc., have been proposed; however, a technique for combining plural of the measuring ways while considering the advantages and disadvantages of these ways so as to efficiently perform determination with high accuracy has not been proposed.

DISCLOSURE OF INVENTION

Therefore, an object of the present invention is to provide a device for measuring a position of a mobile station which can measure the position of the mobile station with high accuracy and high efficiency using a plurality of items of measuring means.

In order to achieve the aforementioned objects, according to the first aspect of the present invention, a device for measuring a position of a mobile station is provided which comprises;

first measuring means for measuring the position of the mobile station based on observed data of signals from satellites using a one-epoch measuring method;

second measuring means for measuring the position of the mobile station using a previous determination result of the position of the mobile station and speed information representative of a speed of the mobile station;

third measuring means for measuring the position of the mobile station using solutions of variables derived from previous determination results of the first or second measuring means; and controlling means for selecting one of the respective measuring means which is to execute its measuring process;

wherein when reliability of the determination result of the selected measuring means is lower than a predetermined reference value, the controlling means selects other measuring means to make it execute its measuring process.

According to the second aspect of the present invention, in the first aspect of the present invention, the controlling means selects the second or third measuring means with higher priority than the first measuring means, when the number of observable satellites exceeds a predetermined number. With this arrangement, it is possible to appropriately reduce the number of the calculation processes by the first measuring means whose calculation load is higher than those of other measuring means, depending on the number of the observable satellites.

According to the third aspect of the present invention, in the first aspect of the present invention, the controlling means selects the first or third measuring means with higher priority than the second measuring means, when the measuring process of the second measuring means continues more than a predetermined time period. With this arrangement, it is possible to remove the accumulation of the drift error included in the solution by the second measuring means at an appropriate stage while making advantageous use of the second measuring means whose calculation load is lower than other measuring means.

According to the fourth aspect of the present invention, in the first aspect of the present invention, the solutions of variables are integer solutions of integer ambiguities.

According to the fifth aspect of the present invention, in the fourth aspect of the present invention, the controlling means selects the first measuring means with higher priority than other measuring means.

In this case, the controlling means is configured to operate in such a manner that if reliability of the determination result of the first measuring means is lower than a predetermined reference value and the integer solutions of integer ambiguities derived from previous determination results of the first or second measuring means are available, the controlling means selects the third measuring means to make it execute its measuring process; and if the reliability of the determination result of the first measuring means is lower than a predetermined reference value and the previous determination result of the position of the mobile station is available, the controlling means selects the second measuring means to make it execute its measuring process.

According to the sixth aspect of the present invention, in the fourth aspect of the present invention, the controlling means selects the third measuring means with higher priority than other measuring means as long as the integer solutions of integer ambiguities derived from previous determination results of the first or second measuring means are available.

In this case, the controlling means is configured to operate in such a manner that if the reliability of the determination result of the third measuring means is lower than a predetermined reference value and the previous determination result of the position of the mobile station is available, the controlling means selects the second measuring means to make it execute its measuring process, and if the previous determination result of the position of the mobile station is not available or if the reliability of the determination result of the third measuring means is lower than a predetermined reference value and the previous determination result of the position of the mobile station is not available, the controlling means selects the first measuring means to make it execute its measuring process.

According to the seventh aspect of the present invention, in the fourth aspect of the present invention, the controlling means selects the second measuring means with higher priority than other measuring means as long as the previous determination result of the position of the mobile station is available.

In this case, the controlling means is configured to operate in such a manner that if reliability of the determination result of the second measuring means is lower than a predetermined reference value and the integer solutions of integer ambiguities derived from previous determination results of the first or second measuring means are available, the controlling means selects the third measuring means to make it execute its measuring process; and if reliability of the determination result of the second measuring means is lower than a predetermined reference value and the integer solutions of integer ambiguities derived from previous determination results of the first or second measuring means are not available, the controlling means selects the first measuring means to make it execute its measuring process.

According to the present invention, a device for measuring a position of a mobile station is obtained which can measure the position of the mobile station with high accuracy and high efficiency using a plurality of items of measuring means.

BRIEF DESCRIPTION OF THE DRAWINGS

These and other objects, features, and advantages of the present invention will become more apparent from the following detailed description of preferred embodiments given with reference to the accompanying drawings, in which.

EXPLANATION FOR REFERENCE NUMBER

10 GPS satellite
20 reference station
22 GPS receiver of reference station
30 vehicle
32 GPS receiver of mobile station
40 processing device
50 vehicle sensor
60 measurement controlling device
70 memory

BEST MODE FOR CARRYING OUT THE INVENTION

In the following, the best mode for carrying out the present invention will be described in detail by referring to the accompanying drawings.

Figure 1:
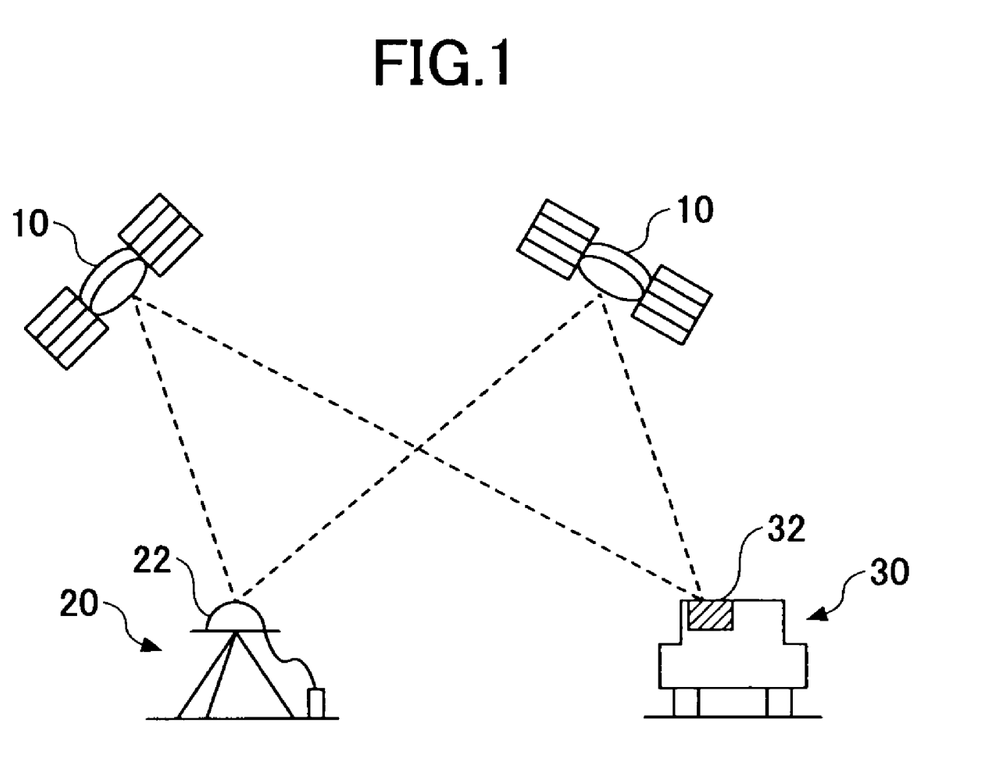
FIG. 1 is a system diagram of a carrier phase GPS positioning system related to the present invention.

FIG. 1 is a system diagram of a carrier phase GPS positioning system related to the present invention. As shown in FIG. 1, the GPS positioning system includes GPS satellites 10 orbiting around the earth, a reference station 20 located at a fixed position (known position), and a vehicle 30 that is on the earth and is able to move on the earth. It is noted that the vehicle 30 is merely an example of a mobile station, and other mobile stations may also include a motorcycle, a train, a ship, a aircraft, a folk lift, a robot, or information terminals such as a mobile phone, etc., which moves due to movement of a human who carries it.

Each of the GPS satellites 10 broadcasts navigation messages toward the earth continuously. The navigation messages include orbital information of the corresponding GPS satellite 10, clock correction values, and correction coefficients of the ionospheric layer. The navigation messages are spread using a C/A code and carried on a L1 carrier (frequency: 1575.42 MHz) to be broadcasted toward the earth.

Presently, there are 24 GPS satellites orbiting the earth at an altitude of 20,000 km. Every four GPS satellites are equally arranged on one of six orbital planes of the earth, which are inclined 55 degrees relative to each other. Therefore, at least five satellites are always observable from a position as long as the position is open to the sky, no matter where the position is on the earth.

Figure 2:
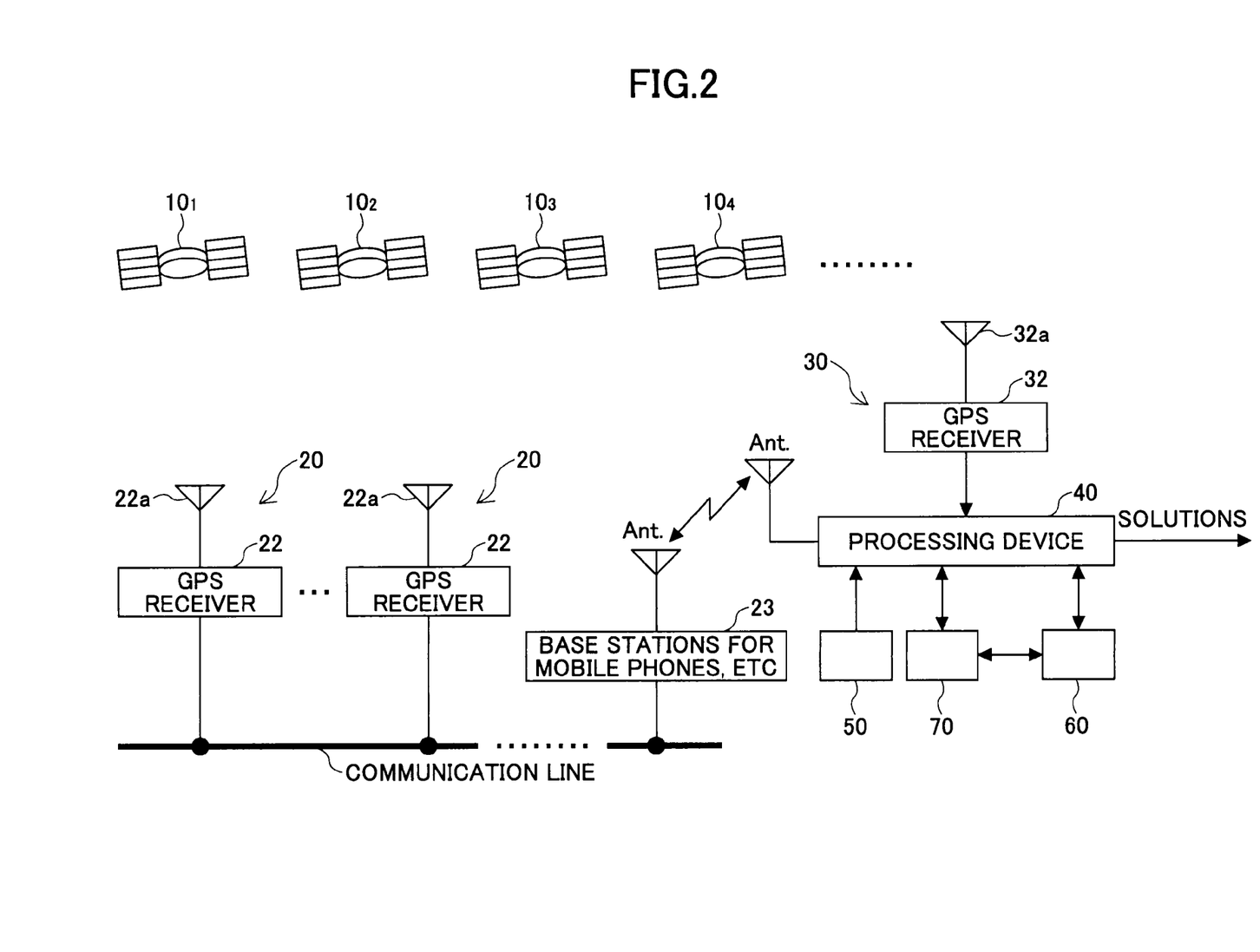
FIG. 2 is a diagram for illustrating the carrier phase GPS positioning system of FIG. 1 in detail.

FIG. 2 is a diagram for illustrating the carrier phase GPS system of FIG. 1 in detail. The vehicle 30 has a GPS receiver 32. In the GPS receiver 32, there is an oscillator (not illustrated) having an oscillating frequency equal to the carrier frequency of the GPS satellite 10. The GPS receiver 32 converts electromagnetic waves (i.e., satellite signal), which are emitted from the GPS satellite 10 and are received by the GPS receiver 32 via a GPS antenna 32a, performs C/A code synchronization using replica C/A codes generated in the GPS receiver 32, and extracts the navigation messages. It is noted that the way of performing the C/A code synchronization may be various and any appropriate way may be adopted. For example, the way of performing the C/A code synchronization may be a way in which a code phase at which a correlation value between the received C/A codes and the replica C/A codes becomes its peak is tracked using DLL (Delay-Locked Loop).

Further, the GPS receiver 32 calculates a carrier phase accumulation value $\Phi_{iu}$ of the carrier waves from the GPS satellites $10_i$ based on the carriers of the respective GPS satellites $10_i$. Here, in the phase accumulation value $\Phi_{iu}$, the subscript i(=1, 2, . . . ) represents the numbers assigned to the GPS satellite $10_i$, and the subscript u represents that the accumulation value is calculated on the side of the vehicle 30. The phase accumulation value $\Phi_{iu}$ can be described as the difference between a phase $\Theta_{iu}(t)$ of the oscillator at the time t of receiving the carrier wave and a phase $\Theta_{iu}(t-\pi)$ of the carrier wave when the satellite signal from the GPS satellite $10_i$ is generated, as shown by the following formula (1).

$$\Phi_{iu}(t)=\Theta_{iu}(t)-\Theta_{iu}(t-\tau_u)+N_{iu}+\epsilon_{iu}(t) \quad (1)$$

Here, $\tau_u$ represents travel time from the GPS satellite 10 to the GPS receiver 32, and $\epsilon_{iu}$ represents noise (uncertainty). Further, at the time when starting observing the phase difference, the GPS receiver 32 can accurately determine the carrier phase within one wavelength of the carrier wave, but cannot determine what number of the wavelengths the present wavelength is. For this reason, in the phase accumulation value $\Phi_{iu}(t)$, as shown in the formula (1), there is an uncertainty factor $N_{iu}$, known as "integer ambiguity".

The GPS receiver 32 is connected to a processing device 40. The processing device 40 is a device which performs various measuring calculation processes which are described later in detail.

The GPS receiver 32 is connected to a vehicle sensor 50 provided on the vehicle 30. The vehicle sensor 50 is a sensor which acquires information (referred to as "vehicle information" hereafter") as to a traveling amount and direction (i.e., azimuth) of the vehicle 30, and may be a combination of several types of sensors. For example, the vehicle sensors 50 may be a combination of a magnetic impedance sensor (i.e., a magnetic field sensor) which detects the azimuth of the vehicle 30 and a acceleration sensor which detects the acceleration of the vehicle 30. Alternatively, the vehicle sensors 50 may be a combination (i.e., an INS sensor) of the acceleration sensor and a yaw rate sensor (i.e., a gyroscope sensor) which detects the speed of the vehicle 30 in a yaw direction (i.e., angular speed). The vehicle sensors 50 may include wheel speed sensors. The vehicle information from the vehicle sensors 50 is input to the processing device 40 periodically.

The processing device 40 is provided with a communication function and is configured to perform two-way communications with a communication facility 23 installed on the reference station 20 such as a base stations for mobile phones, etc.

The reference station 20 is provided with a GPS receiver 22 having a GPS antenna 22a. The GPS receiver 22, the same as the GPS receiver 32 in the vehicle 30, calculates a carrier phase accumulation value $\Phi_{ib}$ at time t based on the carrier waves from the GPS satellites $10_i$, as shown by the following formula (2).

$$\Phi_{ik}(t)=\Theta_{ik}(t)-\Theta_{ik}(t-\tau_k)+N_{ik}+\epsilon_{ik}(t) \quad (2)$$

Here, $N_{ik}$ is an integer ambiguity, and $\epsilon_{ik}$ represents noise (uncertainty). In the phase accumulation value $\Phi_{ik}$, the subscript k represents that the accumulation value is calculated on the side of the reference station 20.

The reference station 20 transmits the obtained carrier phase accumulation value $\Phi_{ik}$ to (the processing device 40 of) the vehicle 30 via the communication facility 23. It is noted that the reference stations 20 are provided in predetermined areas. As illustrated in FIG. 2, each of the reference stations 20 may be connected to one or more communication facilities 23 through the Internet or other networks, or a communication facility 23 may be installed in each of the reference stations 20. In the former case, as long as the vehicle 30 is able to communicate with the communication facility 23, the vehicle 30 can obtain the information received by each of the reference stations 20.

The processing device 40 may be constructed mainly of a microcomputer or a processor (DSP) and has a function of measuring the position of the vehicle 30 by three types of measuring methods described later in detail. The three types of measuring methods include a one-epoch measuring method, a solution inherited measuring method and a speed integrated measuring method. The processing device 40 is connected to a measurement controlling device 60. The measurement controlling device 60 has a function of appropriately selecting a measuring method which is to be executed in the processing device 40, and a function of instructing the processing device 40 as to which is the selected measuring method to be executed, as described later in detail. It is noted that the function of the measurement controlling device 60 may be incorporated in the processing device 40. For example, the measurement controlling device 60 together with the GPS receiver 32 and the measurement controlling device 60 may be installed in a navigation system installed in the vehicle.

Next, based on the premise that the aforementioned configuration is implemented, examples of the three types of measuring methods, that is to say, the one-epoch measuring method, the solution inherited measuring method and the speed integrated measuring method are described in order, and subsequently the function of the measurement controlling device 60 is described.

[One-Epoch Measuring Method]

Here, one example of the one-epoch measuring method implemented by the processing device 40 is described.

Figure 3:
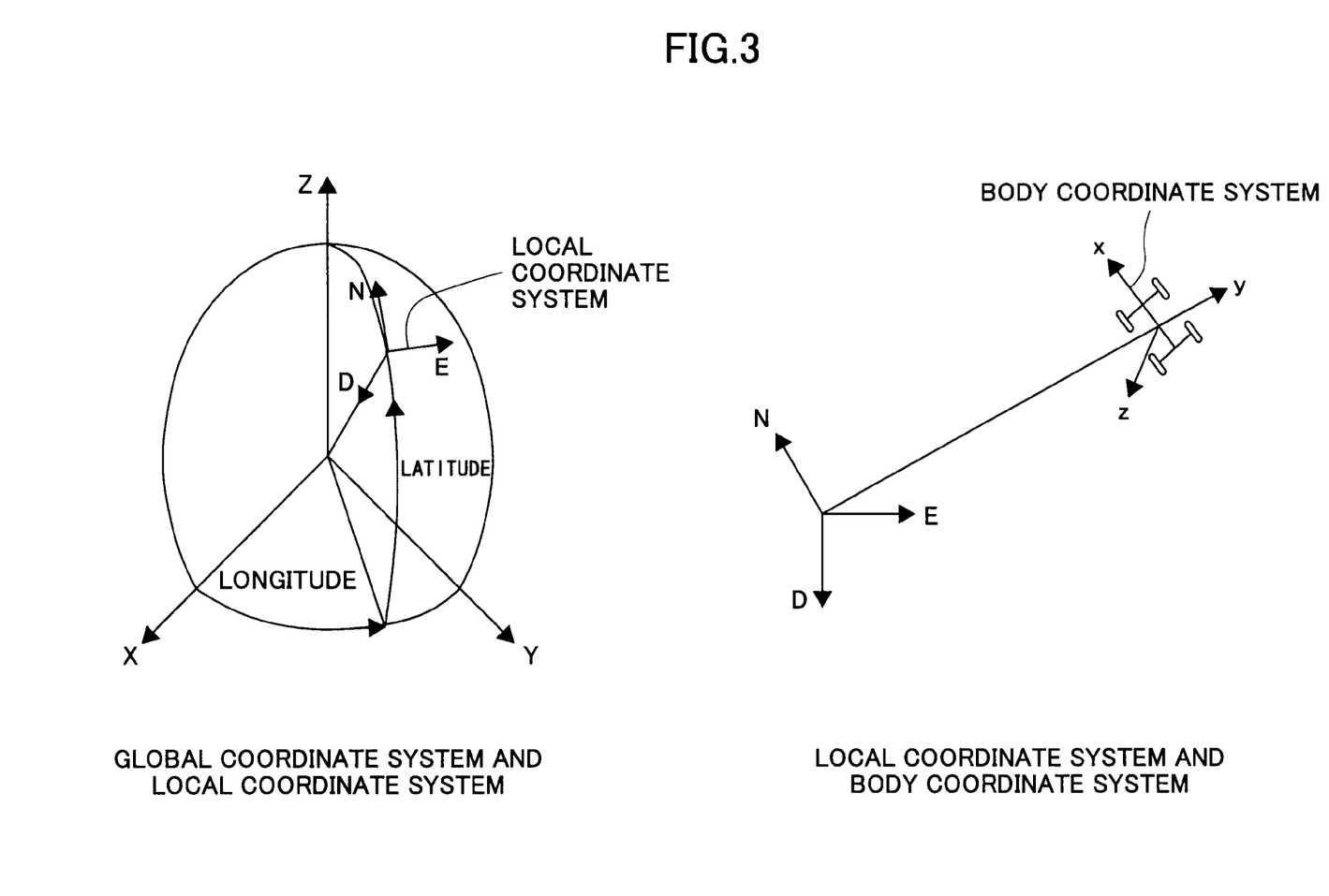
FIG. 3 is a diagram for illustrating the relationship between a global coordinate system and a local coordinate system and the relationship between the local coordinate system and a body coordinate system.

The processing device 40, based on the orbital information in the navigation messages received by the GPS receiver 32, calculates positions $(X_i(i), Y_i(i), Z_i(i))$ of all observable GPS satellites $10_i$ at measuring period (i) in a global coordinate system. It is noted that the movement of each of the GPS satellites 10 is confined to an orbital plane (i.e., a constant plane) passing through the center of gravity of the earth because the GPS satellite 10 is one of artificial satellites. Further, since the orbit of each of the GPS satellites 10 is an ellipse with the center of gravity of the earth as a focus, positions of each of the GPS satellites 10 in the orbital plane can be calculated by successive numerical solutions of Kepler's equation. Because the orbital planes of each of the GPS satellites and the equatorial plane in the global coordinate system satisfy a rotational transformation relationship, positions $(X_i(i), Y_i(i), Z_i(i))$ of the GPS satellites $10_i$ at measuring period (i) of receiving the carrier waves can be calculated by three dimensional rotational coordinate transformation of the positions of the GPS satellites 10 on the orbital planes. It is noted that as illustrated in FIG. 3, in the global coordinate system, the origin is defined to be at the center of gravity of the earth, the X axis and Y axis, which are perpendicular to each other, are in the equatorial plane, and the Z axis is perpendicular to the X axis and Y axis.

The processing device 40 estimates the integer ambiguity based on the observed data related to the respective GPS satellites $10_i$ (i.e., the carrier phase accumulation value $\Phi_{ik}$ on the side the reference station 20, which is received by the vehicle 30, and the carrier phase accumulation value $\Phi_{iu}$ on the side of the vehicle 30). In the following, details of the estimation method will be described.

The double difference of the carrier phase accumulation values related to the GPS satellites $10_j$ and $10_h$ (j is not equal to h) at measuring period (i) can be expressed by the following formula (3).

$$\Phi_{jhku}=(\Phi_{jk}(i)-\Phi_{ju}(i))-(\Phi_{hk}(i)-\Phi_{hu}(i)) \quad (3)$$

On the other hand, because the distance between the GPS satellite $10_i$ and the GPS receiver 22 or 32 equals the wavelength L of the carrier wave multiplied by the phase accumulation value, the double phase difference $\Phi_{jhku}$ of the phase accumulation satisfies the following formula.

$$\Phi_{jhku} = \frac{\left\{\begin{array}{c}\sqrt{\begin{array}{c}(X_k - X_j(i))^2 + \\ (Y_k - Y_j(i))^2 + (Z_k - Z_j(i))^2\end{array}} - \\ \sqrt{\begin{array}{c}(X_u(i) - X_j(i))^2 + \\ (Y_u(i) - Y_j(i))^2 + (Z_u(i) - Z_j(i))^2\end{array}}\end{array}\right\} - \left\{\begin{array}{c}\sqrt{\begin{array}{c}(X_k - X_h(i))^2 + \\ (Y_k - Y_h(i))^2 + (Z_k - Z_h(i))^2\end{array}} - \\ \sqrt{\begin{array}{c}(X_u(i) - X_h(i))^2 + \\ (Y_u(i) - Y_h(i))^2 + (Z_u(i) - Z_h(i))^2\end{array}}\end{array}\right\}}{L + N_{jhku} + \varepsilon_{jhku}} \quad (4)$$

Here, in formula (4), $[X_k, Y_k, Z_k]$ are coordinates (known) of the reference station 20 in the global coordinate system, and $[X_u(i), Y_u(i), Z_u(i)]$ are coordinates (unknown) of the vehicle 30 at period i, $[X_j(i), Y_j(i), Z_j(i)]$ and $[X_h(i), Y_h(i), Z_h(i)]$ are coordinates of the GPS satellites 10$_j$ and 10$_h$ at period i. $N_{jhku}$ represents the double phase difference of the integer ambiguity, that is, $N_{jhku}=(N_{jk}-N_{ju})-(N_{hk}-N_{hu})$. It is noted that the respective values at period i are in synchronism with each other based on GPS time, for example, and this is also true for the following Z(i), etc.

The estimation of the integer ambiguity uses the following observation equation.

$$Z(i)=H*\eta(i)+V(i) \tag{5}$$

$\eta L(i)$ represents state variables at period i (=1, 2, . . . ), and state variables include the position of the vehicle 30 $[X_u(i), Y_u(i), Z_u(i)]$ and the double phase difference of the integer ambiguity. Specifically, assuming that the GPS satellite 10$_j$ among the observable n-GPS satellite 10$_{j-n}$ is set as a reference satellite, $\eta(i)=[X_u(i), Y_u(i), Z_u(i), N_{11ku}, N_{12ku} \ldots, N_{1nku}]^T$, where $^T$ denotes transposing of a matrix. Further, Z (i) and V (i) represent an observation quantity and observation noise, respectively. The observation quantity Z (i) in formula (5) is the double phase difference of the integer ambiguity $N_{jhku}$ (refer to formula (3)). Specifically, Z (i)=$[\Phi_{11ku}, \Phi_{12ku}, \ldots, \Phi_{1nku}]^T$. Since the observation quantity Z is non-linear relative to the state variable $X_u, Y_u, Z_u$, the items in the formula (4) are partially differentiated relative to $X_u, Y_u, Z_u$, thereby obtaining observation matrix H.

The estimated value $\eta^{(+)}(i)$ of the integer ambiguity can be derived using the least-squares method as follows.

$$\eta(+)(i)=(H^TQH)^{-1}H^TQ^{-1}Z(i) \tag{6}$$

Alternatively, the estimated value $\eta^{(+)}$ (i) of the integer ambiguity can be derived using a modified Kalman filter in which the covariance is not carried over for the next epoch. In this case, the modified Kalman filter is constructed as follows, for example.

$$K=P^{(-)}*H^{T}*(H*P^{(-)}*H^T+R)^{-1} \tag{7}$$

$$\eta(i)^{(+)}=\eta(i)^{(-)}+K*(Z(i)-H*\eta(i)^{(-)}) \tag{8}$$

$$P^{(+)}=P^{(-)}-K*H*P^{(-)} \tag{9}$$

Here, Q and R represent the covariance matrix of the external noise and the covariance matrix of the observation noise, respectively. The formula (8) is a filter equation, the formula (7) is a filter gain and the formula (9) is a covariance equation. $\eta(i)^{(-)}$ and $\eta(i)^{(+)}$ are a predicted value (an initial value or the previous value) and an estimated value, respectively. $P^{(+)}$ and $P^{(-)}$ are a predicted error covariance and a estimated error covariance, respectively, and represent estimation accuracy of $\eta(i)^{(-)}$ and $\eta(i)^{(+)}$, respectively. Further, the formula (8) indicates that the estimated value $\eta(i)^{(+)}$ is derived by adding a correction value, which is obtained by multiplying the observed prediction error by the Kalman gain (correction gain) K, to the predicted value $\eta(i)^{(-)}$.

Here, in implementing the one-epoch measuring method the difference with respect to an ordinary Kalman filter is that the predicted error covariance matrix $P^{(-)}$ is initialized at every period (i.e., on an epoch basis) and thus the covariance is not inherited between measuring periods. In other words, a predetermined constant matrix is always used as an error covariance matrix $P^{(-)}$. In this case, the error covariance matrix $P^{(-)}$ may have diagonal components of 100/3 and other components of 0, for example. However, this value is not necessarily a predetermined value, and may be a varying value having high likelihood (but the varying manner is different from that in the covariance inherited process).

It is noted that in the case of either the least-squares method or the Kalman filter, the items of the estimated value $\eta^{(+)}$ of the integer ambiguity are derived as real solutions. However, since the integer ambiguity is integer, the integer solutions (that is, wave number) closest to the derived real solutions are derived. For example, the LA-MBDA can be used for this purpose, which de-correlates the integer ambiguities, and narrows the searching space of the integer solutions so as to facilitate finding the solutions. Once the integer solutions of integer ambiguities are fixed in this way, the position of the vehicle 30 is calculated using the integer solutions of integer ambiguities.

According to the aforementioned one-epoch measuring method, it is possible to obtain solutions with high accuracy with respect to other measuring methods described hereafter in a circumstance where an influence of noise is small. Further, according to the aforementioned one-epoch measuring method, the estimation (measurement) result of the previous measuring period doesn't have any influence on the estimation result of this measuring period. Therefore, even in the case of the vehicle 30 with relatively high mobility, for example, the overshoot or the like which would occur when the traveling direction of the vehicle 30 changes suddenly (for example, at a curved corner) is prevented, which enables obtaining the measurement results with relatively high accuracy.

The processing device 40 supplies the navigation system (not shown), for example, with the calculated position of the vehicle 30 as a measurement result of this measuring period (i). Further, the processing device 40 stores the solutions derived as mentioned above in a memory 70 (see FIG. 2). The solutions of the integer ambiguities stored in this way are used in the measuring process by the solution inherited measuring method described hereafter. Further, the solution of the vehicle position stored is used in the measuring process by the speed integrated measuring method described hereafter.

The processing device 40 calculates reliability of the derived solutions. The ways of calculating or evaluating the reliability of the solutions may be various, and any appropriate way may be adopted. For example, the reliability of the solutions may be derived by calculating a variance $\sigma$ of the solutions or the sum of squares of the residuals T. The sum of squares of the residuals T may be calculated by calculating a residual vector $\gamma(i)$ in a manner indicated by the following formula (10) using the derived estimated value $\eta(i)^{(+)}$ of the integer ambiguities or the solutions thereof at first, and then using the following formula (11).

$$\gamma(i)=Z(i)H*\eta^{(+)}(i) \tag{10}$$

$$T=\gamma(i)*Q^{-1}*\gamma(i)/m \tag{11}$$

Here, Q denotes an error matrix, and m denotes the number of unknown quantities.

The reliability of the solutions calculated in this way is outputted to the measurement controlling device 60 every time when the solutions are calculated by the one-epoch measuring method.

[Solution Inherited Measuring Method]

Here, one example of the solution inherited measuring method implemented by the processing device 40 is described.

The processing device 40 measures the position of the vehicle 30 $[X_u(i), Y_u(i), Z_u(i)]$ at this measuring period (i) using (i.e., inheriting) the integer ambiguities (integer solutions) obtained at the previous measuring period (i−1). In other words, the processing device 40 calculates the position of the vehicle 30 [$X_u(i), Y_u(i), Z_u(i)$] at this measuring period (i) based on the relationship indicated by the formula (4), using the integer ambiguities obtained at the previous measuring period (i−1) and the observation quantity Z (i) obtained at this measuring period (i)

According to the solution inherited measuring method, the integer ambiguities (integer solutions) obtained at the previous measuring period are used, and thus it is not necessary to calculate them. Therefore, it is possible to obtain the solutions with high accuracy with low calculation load.

The processing device 40 supplies the calculated position of the vehicle 30 to the navigation system (not shown), for example, and stores it as the solution of this period (i). At that time, the integer ambiguities of the previous measuring period, which are utilized in the solution inherited measuring process, are stored in the memory 70 in a form included in the integer ambiguities of this period.

The processing device 40 calculates reliability of the derived solutions. The way of calculating the reliability of the derived solutions may be the same as the way described in connection with the one-epoch measuring method. The reliability of the solutions calculated in this way is outputted to the measurement controlling device 60 every time when the solutions are calculated by the solution inherited measuring method.

[Speed Integrated Measuring Method]

Here, one example of the speed integrated measuring method implemented by the processing device 40 is described.

The processing device 40 measures the position of the vehicle 30 [$X_u(i), Y_u(i), Z_u(i)$] at this measuring period (i) by setting the position of the vehicle 30 [$X_u(i-1), Y_u(i-1), Z_u(i-1)$] obtained at the previous measuring period (i−1) as an initial position, and adding a movement vector between the previous period and this measuring period to the initial position. The movement vector is calculated based on the vehicle information from the vehicle sensor 50. The ways of calculating the movement vector may be various, and any appropriate way may be used. For example, the direction of the movement vector may be derived from the direction of the vehicle 30 (for example, the information from the magnetic field sensor), and the amount of movement (i.e., the magnitude of the movement vector) may be derived by integrating twice the acceleration signals (or filtered acceleration signals) from the acceleration sensor. The amount of movement of the vehicle 30 may be derived using other parameters representative of the vehicle speed, such as vehicle speed pulses from the wheel speed sensors or the number of revolutions of the output shaft of the transmission. Alternatively, the movement vector may be calculated using the INS sensor (the acceleration sensor and the gyroscope sensor) as vehicle sensors 50. Alternatively, the movement vector may be derived based on the Doppler shift frequencies Δf of the carriers of the satellite signals. The Doppler shift frequency Δf is measured by correlating the received wave from the GPS satellite 10 and the replica carrier generated in the GPS receiver 32. In this case, the difference (=fr−fc) between the replica carrier frequency fr at which the correlation value becomes its peak and the known carrier frequency fc (1575.42 MHz) is detected as the Doppler shift frequency Δf. In this case, for example, the relative speed ΔV between the GPS satellite 10 and the vehicle 30 may be calculated using the relationship of Δf=ΔV*fc/(c−ΔV), and then the movement vector is calculated as a differential vector between the speed vector of the vehicle 30 with respect to the GPS satellite 10 and the movement vector of the GPS satellite 10 (which is a differential vector between the satellite position of the previous period and the satellite position of this period).

The initial position, that is to say, the position of the vehicle 30 [$X_u(i-1), Y_u(i-1), Z_u(i-1)$] obtained at the previous measuring period (i−1) may be one which is derived by the one-epoch measuring method, the solution inherited measuring method, the speed integrated measuring method, or other measuring methods. Other measuring methods may be carrier phase positioning methods other than the one-epoch measuring method, or a point positioning method using measurements of the pseudo ranges.

According to the speed integrated measuring method, the solution of the position of the vehicle 30 at this measuring period is obtained using the position of the vehicle 30 at the previous measuring period and the movement vector which can be derived with low calculation load. Therefore, it is possible to substantially reduce the calculation load. Further, if the vehicle sensor 50 is an INS sensor, it is possible to shorten the measuring period (for example, high sample rate such as 100 Hz is possible in comparison with sample rates of 1 Hz-20 Hz in the GPS receiver 32).

The processing device 40 may calculate the integer ambiguities [$N_{11ku}, N_{12ku}, \ldots, N_{1nku}$]$^T$ at this measuring period (i) based on the relationships shown in the formulas (4)-(6) using the position of the vehicle 30 [$X_u(i), Y_u(i), Z_u(i)$] calculated as mentioned above and the observation quantity Z (i) obtained at this measuring period (i). In other words, the processing device 40 may calculate the integer ambiguities by inverse operation. In this case, the processing device 40 again derives the integer solutions of the integer ambiguities and stores them in the memory 70 as solutions of this period (i) together with the calculation result of the position of the vehicle 30.

The processing device 40 calculates reliability of the derived solutions. The way of calculating the reliability of the derived solutions may be the same as the way described in connection with the one-epoch measuring method. It is noted that in the case of calculating the sum of squares of the residuals T, the observation quantity Z (i) obtained at this measuring period (i), the position of the vehicle 30 derived by the speed integrated measuring method and the integer ambiguities derived therefrom are used. The reliability of the solutions calculated in this way is outputted to the measurement controlling device 60 every time when the solutions are calculated by the speed integrated measuring method.

[Function of Measurement Controlling Device 60]

Here, examples of the preferred three measurement control algorithms A, B and C implemented by the measurement controlling device 60 are described. Any one of the measurement control algorithms A, B and C may be executed, or more than one of the measurement control algorithms A, B and C may be executed by performing the switching between them according to situations as mentioned later in connection with FIG. 7 and FIG. 8.

[Algorithm A]

Figure 4:
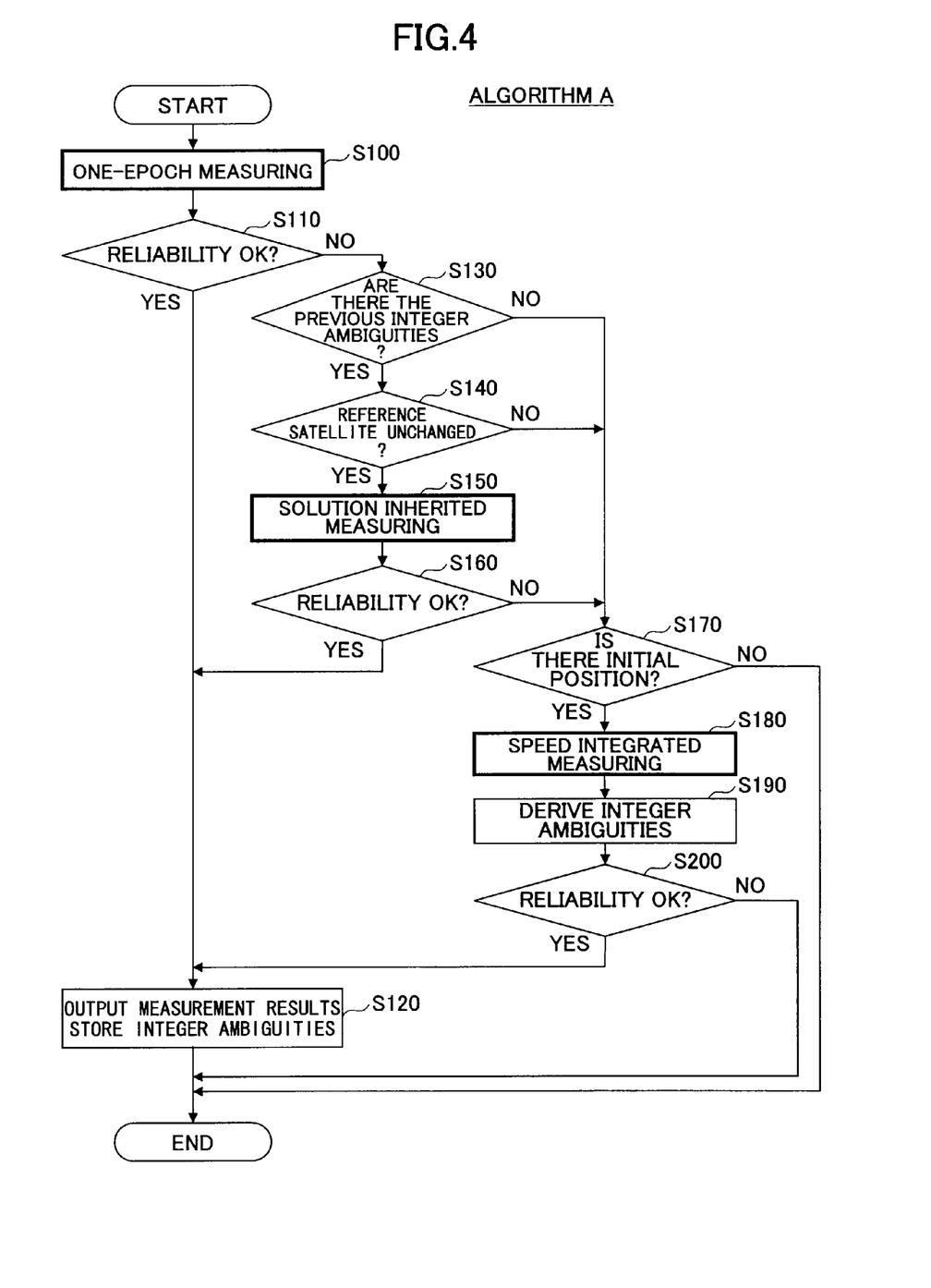
FIG. 4 is a flowchart for illustrating a main process of an algorithm A.

FIG. 4 is a flowchart for illustrating a main process of an algorithm A. In the case of adopting the algorithm A alone, the process routine shown in FIG. 4 may be executed repeatedly after an ignition switch of the vehicle 30 is turned on until the ignition switch is turned off, for example.

In step 100, the measurement controlling device 60 provides the processing device 40 with the instruction to execute the one-epoch measuring process. In this case, the processing device 40 derives the solutions at this period (i) by the one-epoch measuring method as mentioned above.

In step 110, the measurement controlling device 60 evaluates the reliability of the solutions at this period (i), based on the reliability calculated for the solutions at this period (i).

Specifically, if the calculated reliability is greater than a predetermined threshold Th1, the process routine goes to step 120, having determined that the reliability of the solutions at this period (i) is high. On the other hand, if the calculated reliability is less than or equal to the predetermined threshold Th1, the process routine goes to step 130, having determined that the reliability of the solutions at this period (i) is low. The predetermined threshold Th1 may be a value adapted through experiments while considering the required measuring accuracy.

In step 120, the measurement controlling device 60 provides the processing device 40 with the instruction to output the solutions at this period (i) The solutions at this period (i) outputted from the processing device 40 are supplied to the navigation system, for example. Further, the measurement controlling device 60 provides the processing device 40 with the instruction to store the solutions obtained at this period (i) in the memory 70. In this way, the solutions stored in the memory 70 are updated.

In step 130, the measurement controlling device 60 checks the integer ambiguities of the solutions stored in the memory 70 and determines whether there are integer ambiguities which are updated or stored at the previous period. If there are integer ambiguities stored in the memory 70, the process routine goes to step 140, having determined that the solution inherited measuring process is possible. On the other hand, if there are not the integer ambiguities stored in the memory 70, the process routine goes to step 170, having determined that the solution inherited measuring process is not possible.

In step 140, the measurement controlling device 60 determines whether the reference satellite remains unchanged between this period (i) and the previous period (i−1). If the reference satellite remains unchanged, the process routine goes to step 150, having determined that the integer ambiguities of the solutions at the previous period (i−1) stored in the memory 70 can be utilized (i.e., the solution inherited measuring process is possible). If the reference satellite has changed, the process routine goes to step 150, having determined that the integer ambiguities at the previous period (i−1) stored in the memory 70 cannot be utilized.

In step 150, the measurement controlling device 60 provides the processing device 40 with the instruction to execute the solution inherited measuring process. In this case, the processing device 40 derives the solutions at this period (i) by the solution inherited measuring method as mentioned above. It is noted that in the case of reaching this step 150, the processing device 40 performs the measuring process at least two times (i.e., the one-epoch measuring process and the solution inherited measuring process) at this period (i).

In step 160, the measurement controlling device 60 evaluates the reliability of the solutions obtained by the solution inherited measuring process. Specifically, if the reliability calculated for the solutions obtained by the solution inherited measuring process is greater than a predetermined threshold Th2, the measurement controlling device 60 determines that the reliability of the solutions at this period (i) is high and the process routine goes to step 120. In this case, in step 120, the solutions obtained at this period (i) by the solution inherited measuring process is stored in the memory 70. On the other hand, if the calculated reliability is less than or equal to the predetermined threshold Th2, the process routine goes to step 170, having determined that the reliability of the solutions at this period (i) is low. The predetermined threshold Th2 may be a value adapted through experiments. The predetermined threshold Th2 may be the same as the predetermined threshold Th1 related to the process in step 110, or may be greater (easer to be exceeded) than the predetermined threshold Th1.

In step 170, the measurement controlling device 60 checks the solutions stored in the memory 70 and determines whether there is data of the initial position which is updated or stored at the previous period. If there is data of the initial position stored in the memory 70, the process routine goes to step 180, having determined that the speed integrated measuring process is possible. On the other hand, if there is not data of the initial position stored in the memory 70, the process routine at this period (i) terminates without doing any further process, having determined that the speed integrated measuring process is not possible, either. In this case, since the process routine terminates without executing step 120 and thus the solutions stored in the memory 70 is not updated at this period (i), determination result will be negative in step 130 or step 170 at the next period (i+1).

In step 180, the measurement controlling device 60 provides the processing device 40 with the instruction to execute the speed integrated measuring process. In this case, the processing device 40 derives the solutions at this period (i) by the speed integrated measuring method as mentioned above. It is noted that in the case of reaching this step 180, the processing device 40 performs the measuring process three times (i.e., the one-epoch measuring process, the solution inherited measuring process, and the speed integrated measuring process) at this period (i).

In step 190, the measurement controlling device 60 provides the processing device 40 with the instruction to derive the integer ambiguities using the result obtained by the speed integrated measuring process. In this case, the processing device 40 derives the integer ambiguities by inverse operation using the result obtained by the speed integrated measuring process and the observation quantity Z (i) obtained at this period (i).

In step 200, the measurement controlling device 60 evaluates the reliability of the solutions obtained by the speed integrated measuring process. Specifically, if the reliability calculated for the solutions obtained by the speed integrated measuring process is greater than a predetermined threshold Th3, the measurement controlling device 60 determines that the reliability of the solutions at this period (i) is high and the process routine goes to step 120. In this case, in step 120, the solutions (including the integer ambiguities derived in step 190) obtained at this period (i) by the speed integrated measuring process are stored in the memory 70. On the other hand, if the calculated reliability is less than or equal to the predetermined threshold Th3, the process routine terminates without doing any further process, having determined that the reliability of the solutions at this period (i) is low. In this case, since the process routine terminates without executing step 120 and thus the solutions stored in the memory 70 are not updated at this period (i), determination result will be negative in step 130 or step 170 at the next period (i+1). The predetermined threshold Th3 may be a value adapted through experiments. The predetermined threshold Th3 may be the same as the predetermined threshold Th1 related to the process in step 110, or may be greater (easer to be exceeded) than the predetermined threshold Th1 or Th2.

According to the aforementioned algorithm A, although the one-epoch measuring method is used with higher priority with respect to the two other measuring methods, it is possible to obtain measurement results with high accuracy. Further, although with the one-epoch measuring method there may be a situation where the measurement fails due to influence of noise (or where the reliability is low), it is possible to continue measuring with high accuracy by performing the solution inherited measuring method or the speed integrated measuring method in such a situation.

It is noted that the aforementioned algorithm A is configured to use the one-epoch measuring method with higher priority with respect to the speed integrated measuring method; conversely it is also possible to configure to use the speed integrated measuring method with higher priority with respect to the one-epoch measuring method.

[Algorithm B]

Figure 5:
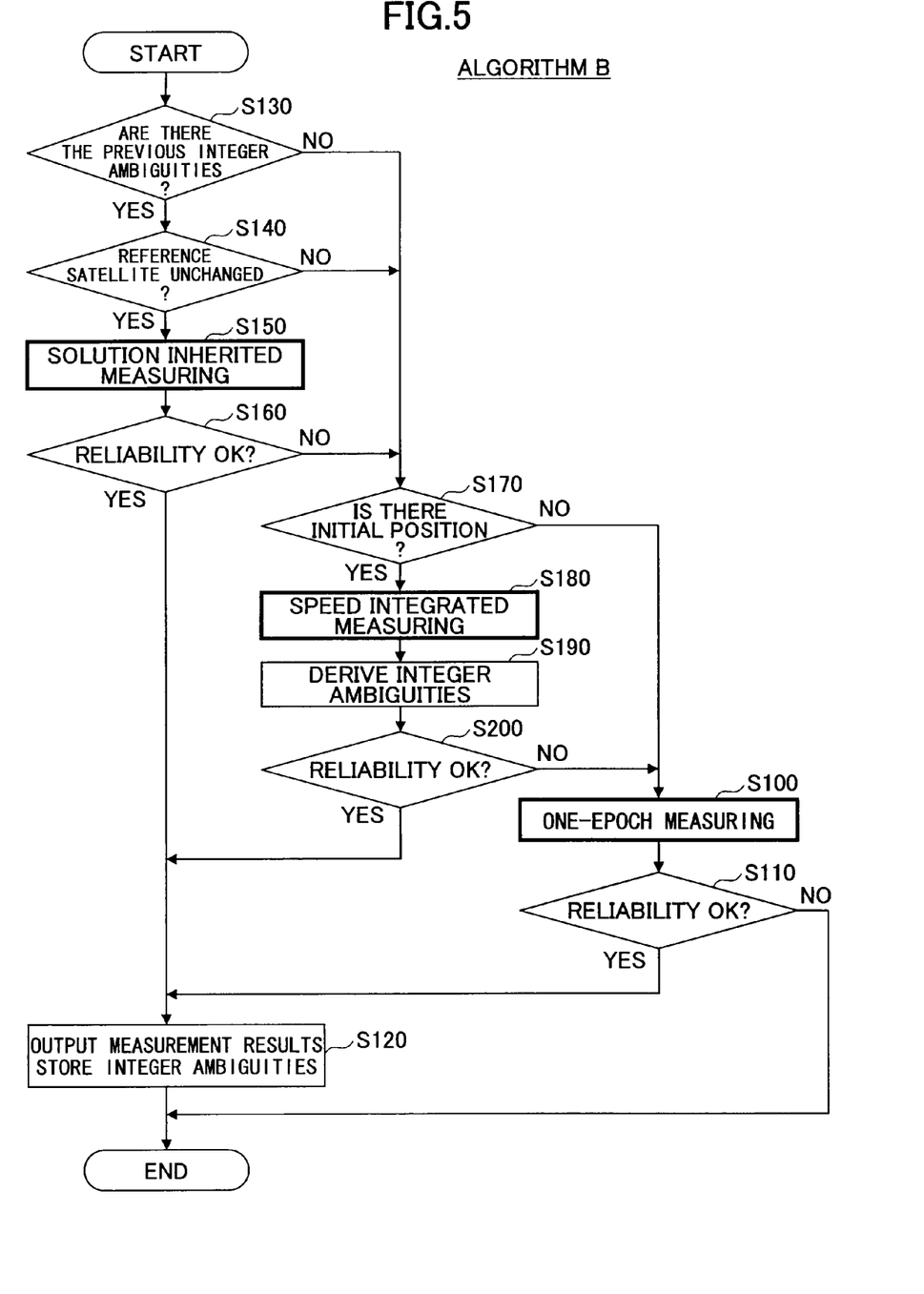
FIG. 5 is a flowchart for illustrating a main process of an algorithm B.

FIG. 5 is a flowchart for illustrating a main process of an algorithm B. In the case of adopting the algorithm B alone, the process routine shown in FIG. 5 may be executed repeatedly after an ignition switch of the vehicle 30 is turned on until the ignition switch is turned off, for example.

The algorithm B differs from the algorithm A in its processing order, as shown in FIG. 4 and FIG. 5. The respective processes of the algorithm B are substantially the same as the corresponding processes of the algorithm A. Thus, here, the explanation for the processes which are substantially the same as the corresponding processes of the algorithm A is omitted by using the same step numerals.

According to the aforementioned algorithm B shown in FIG. 5, although the solution inherited measuring method is used with higher priority with respect to the two other measuring methods, it is possible to prevent the one-epoch measurement method whose calculation load is high from being executed every period. Thus, it is possible to reduce the calculation load per one measuring period and thus reduce the calculation time with respect to the one-epoch measuring method. Further, although the solution inherited measuring method cannot be performed in a situation where the reference satellite changes due to the movement of the vehicle 30 or a lapse of time, it is possible to continue measuring with high accuracy by performing the one-epoch measuring method or the speed integrated measuring method in such a situation.

It is noted that the aforementioned algorithm B is configured to use the speed integrated measuring method with higher priority with respect to the one-epoch measuring method; conversely it is also possible to configure to use the one-epoch measuring method with higher priority with respect to the speed integrated measuring method.

[Algorithm C]

Figure 6:
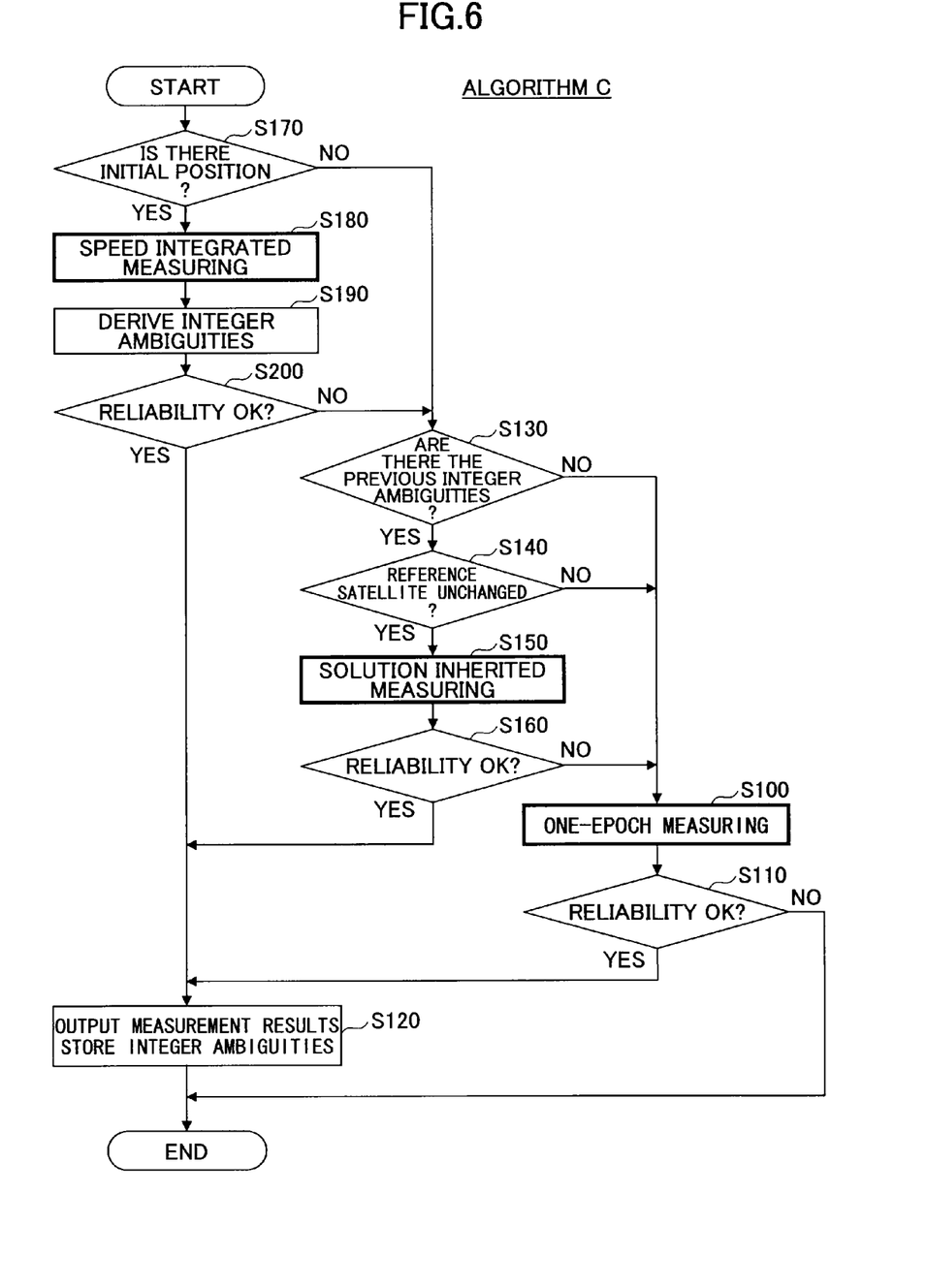
FIG. 6 is a flowchart for illustrating a main process of an algorithm C.

FIG. 6 is a flowchart for illustrating a main process of an algorithm C. In the case of adopting the algorithm C alone, the process routine shown in FIG. 6 may be executed repeatedly after an ignition switch of the vehicle 30 is turned on until the ignition switch is turned off, for example.

The algorithm C differs from the algorithm A in its processing order, as shown in FIG. 4 and FIG. 6. The respective processes of the algorithm C are substantially the same as the corresponding processes of the algorithm A. Thus, here, the explanation for the processes which are substantially the same as the corresponding processes of the algorithm A is omitted by using the same step numerals.

According to the aforementioned algorithm C shown in FIG. 6, although the speed integrated measuring method is used with higher priority with respect to the two other measuring methods, it is possible to prevent the one-epoch measurement whose calculation load is high from being executed every period. Thus, it is possible to reduce calculation load and thus reduce the calculation time with respect to the one-epoch measuring method. Further, since the speed integrated measuring method can be executed even when the reference satellite changes and can output the measurement results with a high sample rate, it is possible to make advantageous use of these advantages. Further, although the speed integrated measuring method requires the initial position, it is possible to continue measuring with high accuracy by performing the one-epoch measuring method or the solution inherited measuring method even if such data of the initial position is not available. It is noted that since the data of the initial position is generated by performing the one-epoch measuring method or the solution inherited measuring method, it is possible to initiate the speed integrated measuring process again from the next period.

It is noted that although the aforementioned algorithm C is configured to use the solution inherited measuring method with higher priority with respect to the one-epoch measuring method, it is also possible to configure to use the one-epoch measuring method with higher priority with respect to the solution inherited measuring method.

Next, the way of performing the switching between the aforementioned algorithms A, B and C according to situations is described.

[First Algorithm Switching Method]

Figure 7:
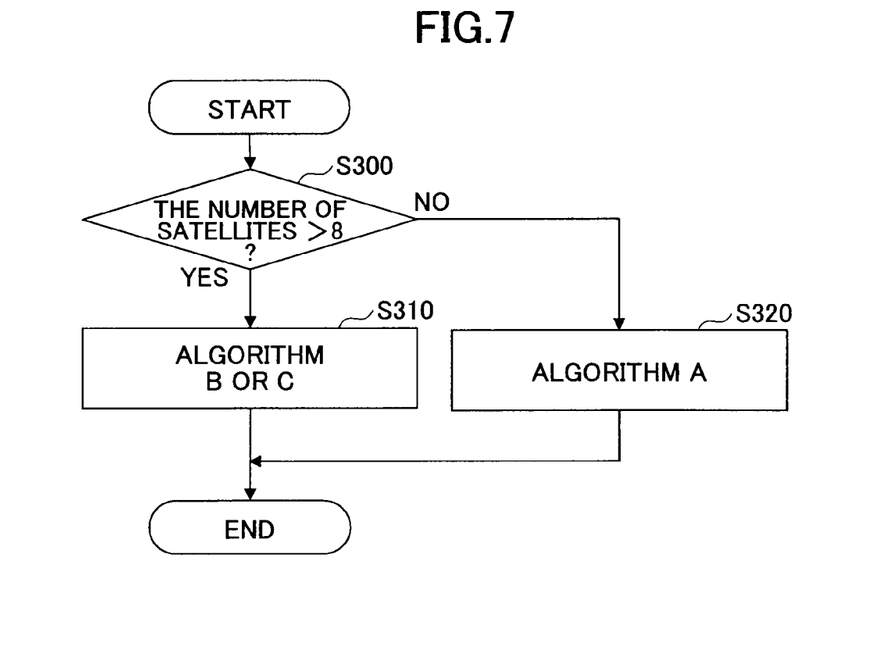
FIG. 7 is a flowchart for illustrating an algorithm switching manner according to a first algorithm switching method.

FIG. 7 is a flowchart for illustrating an algorithm switching manner according to a first algorithm switching method. The process routine shown in FIG. 7 may be executed repeatedly after an ignition switch of the vehicle 30 is turned on until the ignition switch is turned off, for example.

In step 300, the measurement controlling device 60 determines whether the number of the currently observable GPS satellites 10 is greater than or equal to a predetermined number Th4 (for example, 8). The observable GPS satellites 10 may be GPS satellites 10 from which the satellite signals can be received with radio field intensity more than a predetermined level and without cycle slip. It is noted that the predetermined number Th4 corresponds to a critical number above which the calculation load or the calculation time in the one-epoch measuring method becomes substantially greater than those in other measuring methods and may be a value adapted through experiments. If it is determined that the number of the observable GPS satellites 10 is greater than or equal to the predetermined number Th4, the process routine goes to step 310. On the other hand, if it is determined that the number of the observable GPS satellites 10 is less than the predetermined number Th4, the process routine goes to step 320.

In step 310, the measurement controlling device 60 performs the measurement control according to the aforementioned algorithm B or C. This is because the calculation time according to the aforementioned algorithm A becomes long when the number of the observable GPS satellites 10 is great. For example, if the number of the observable GPS satellites 10 is 8, seven double phase differences of the integer ambiguities are unknowns, and it take time to determine integer solutions of these unknowns. In other words, it is taken into account that the aforementioned algorithm B or C which uses the measuring method whose calculation load is low with higher priority is suited for the situation where the number of the observable GPS satellites 10 is great.

In step 320, the measurement controlling device 60 performs the measurement control according to the aforementioned algorithm A. This is because in the case where the number of the observable GPS satellites 10 is not so great, even with the aforementioned algorithm A which uses the one-epoch measuring method with higher priority, the calculation time doesn't become unduly long, and thus it is useful to put higher priority on the accuracy of measurement.

In this way, according to the first algorithm switching method, it is possible to improve compatibility between the calculation time and the accuracy of measurement by performing the switching between the algorithms A, B and C according to the number of the observable GPS satellites 10.

[Second Algorithm Switching Method]

Figure 8:
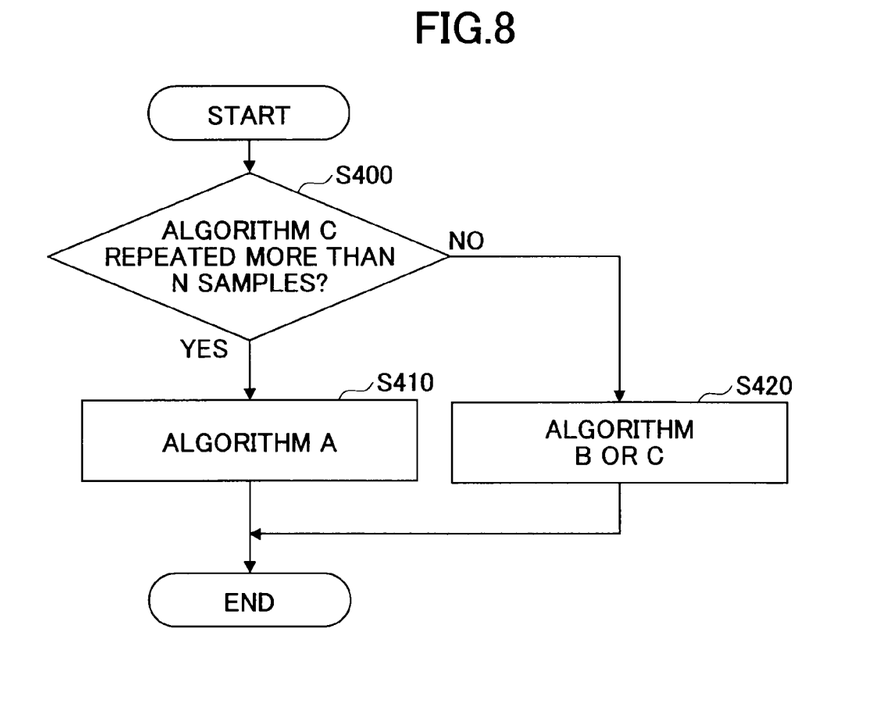
FIG. 8 is a flowchart for illustrating an algorithm switching manner according to a second algorithm switching method.

FIG. 8 is a flowchart for illustrating an algorithm switching manner according to a second algorithm switching method. The process routine shown in FIG. 8 may be executed repeatedly after an ignition switch of the vehicle 30 is turned on until the ignition switch is turned off, for example.

In step 400, the measurement controlling device 60 determines whether the measurement control according to the aforementioned algorithm C is performed for more than N successive samples (successive N measuring periods). It is noted that the aforementioned threshold N corresponds to the number of measuring periods at which the accumulation of the drift errors affects the accuracy of the measurement results and may be a value adapted through experiments. If the determination result is affirmative, the process routine goes to step 410. On the other hand, if the determination result is negative, the process routine goes to step 420.

In step 410, the measurement controlling device 60 switches the algorithm from the algorithm C to the algorithm A, and thus performs the measurement control according to the aforementioned algorithm A. This is because when the algorithm C is executed over many successive periods, the calculation load is low and a high sample rate can be implemented, but the drift errors included in outputs of the vehicle sensor 50 are accumulated. In this way, it is possible to remove (reset) the drift errors accumulated in the solutions by performing the algorithm A. It is noted that once the algorithm A is performed and the one-epoch measuring is successfully performed, it is possible to initiate the algorithm C or B again from the next period, for example.

In step 420, the measurement controlling device 60 maintains the algorithm C, or the measurement controlling device 60 switches the algorithm from the algorithm C to the algorithm B, and thus performs the measurement control according to the aforementioned algorithm C or B. This is because in the case of the relatively small successive periods, it can be considered that the drift errors included in outputs of the vehicle sensor 50 are not substantially accumulated and thus it is better to put higher priority on the calculation load.

In this way, according to the second algorithm switching method, it is possible to improve the trade-off between the calculation time and the accuracy of measurement by switching between the algorithms A, B and C according to the number of the successive measuring periods of the algorithm C.

The following variant of the aforementioned second algorithm switching method can be contemplated.

For example, in the step 400, the measurement controlling device 60 may determine whether the solution by the speed integrated measuring method is adopted for more than N successive samples (i.e., the affirmative determination result in step 200 of the algorithm C is made more than successive N samples) under the condition in which the measurement control according to the aforementioned algorithm C is performed. Similarly, the measurement controlling device 60 may determine whether the solution by the speed integrated measuring method is adopted for more than N successive samples under the condition in which the measurement control according to the aforementioned algorithm B is performed. Even in these cases, it is possible to remove the accumulated drift errors by switching to the algorithm A and performing the measurement control according to the aforementioned algorithm C or B.

It is noted that in the aforementioned embodiments the "first measuring means" in claims is implemented when the processing device 40 executes the process of step 100 in FIG. 4, etc., the "second measuring means" in claims is implemented when the processing device 40 executes the process of step 180 in FIG. 4, etc., and the "third measuring means" in claims is implemented when the processing device 40 executes the process of step 150 in FIG. 4, etc.

The present invention is disclosed with reference to the preferred embodiments. However, it should be understood that the present invention is not limited to the above-described embodiments, and variations and modifications may be made without departing from the scope of the present invention.

For example, in the above embodiments, if the GPS receivers 22 and 32 are two-frequency receivers capable of receiving both of the L1 wave and L2 wave emitted from the GPS satellite 10, for each of the L1 wave and L2 wave, the double phase difference $\Phi_{jhku}$ of the phase accumulation for the L2 wave is used additionally or alternatively as the observation quantity Z. Further, the double phase difference $\Phi_{jhku}$ of the phase accumulation for carrier wave of other bands (for example, the L5 wave which is planned to be added in the future) may be used additionally or alternatively as the observation quantity Z.

Further, although in the above embodiments the aforementioned three types of the measuring methods are used, more than four measuring methods may be used by combining the aforementioned three types of the measuring methods with other measuring methods. In this way, if a manner in which the aforementioned three types of the measuring methods are used is the same as the manner in the above embodiments, the same effect can be obtained.

In addition, in the above embodiments, it is described that the double phase difference is calculated to eliminate influence of the initial phase of oscillators in the GPS receivers 22 and 32, and clock errors. Of course, the single phase difference can also be used in which the influence of the initial phase of oscillators in the GPS receivers 22 and 32, and clock uncertainties can be eliminated. In addition, in the above embodiments, the influence of the ionospheric layer refraction effect, tropospheric bending effect, and multi-path are not considered, but the present invention is also applicable when considering these effects.

In the above, for simplicity, the GPS satellite $10_1$ is regarded as a reference satellite, but depending on the positions of the vehicle 30 and the reference station 20 and elevation angles of the respective GPS satellites, etc., any other GPS satellites $10_i$ (=2, 3, . . . ) may also be used as the reference satellite. It is noted that in general the GPS satellite whose elevation angle is the greatest among the observable GPS satellites is selected as the reference satellite.

Further, although the present invention is applied to GPS in the above embodiments, the present invention can be applied to another GNSS (Global Navigation Satellite System) such as Galileo.

The present application is based on Japanese Priority Application No. 2006-313434, filed on Nov. 20, 2006, the entire contents of which are hereby incorporated by reference.

The invention claimed is:

1. A device for measuring a position of a mobile station, comprising:
   first measuring means for measuring the position of the mobile station based on observed data including a carrier phase of signals from satellites using a one-epoch measuring method in which only the observed data is used, independently epoch by epoch, said one-epoch measuring method performing measuring without inheriting an integer ambiguity or an error covariance from the previous epoch;

second measuring means for measuring the position of the mobile station using a previous determination result of the position of the mobile station and speed information representative of a speed of the mobile station;

third measuring means for measuring the position of the mobile station using solutions of variables derived from previous determination results of the first or second measuring means; and controlling means for selecting one of the respective measuring means which is to execute a respective measuring process as the selected measuring means; and reliability calculating means for calculating reliability of the measurement result for the selected measuring means, wherein when the calculated reliability of the measurement result of the selected measuring means is lower than a predetermined reference value, the controlling means selects another measuring means as the selected measuring unit, the another measuring means executing a respective measuring process as the selected measuring means.

2. The device for measuring a position of a mobile station as claimed in claim 1, wherein the controlling means selects the second or third measuring means with higher priority than the first measuring means, when the number of observable satellites exceeds a predetermined number.

3. The device for measuring a position of a mobile station as claimed in claim 1, wherein the controlling means selects the first or third measuring means with higher priority than the second measuring means, when the measuring process of the second measuring means continues more than a predetermined time period.

4. The device for measuring a position of a mobile station as claimed in claim 1, wherein the solutions of variables are integer solutions of integer ambiguities.

5. The device for measuring a position of a mobile station as claimed in claim 4, wherein the controlling means selects the first measuring means with higher priority than other measuring means, and wherein when the reliability of the determination result of the first measuring means is lower than a predetermined reference value and the integer solutions of integer ambiguities derived from previous determination results of the first or second measuring means are available, the controlling means selects the third measuring means to make it execute its measuring process; and when the reliability of the determination result of the first measuring means is lower than a predetermined reference value and the previous determination result of the position of the mobile station is available, the controlling means selects the second measuring means to make it execute its measuring process.

6. The device for measuring a position of a mobile station as claimed in claim 4, wherein the controlling means selects the third measuring means with higher priority than other measuring means as long as the integer solutions of integer ambiguities derived from previous determination results of the first or second measuring means are available, and wherein when the reliability of the determination result of the third measuring means is lower than a predetermined reference value and the previous determination result of the position of the mobile station is available, the controlling means selects the second measuring means to make it execute its measuring process, and when the previous determination result of the position of the mobile station is not available or if the reliability of the determination result of the third measuring means is lower than a predetermined reference value and the previous determination result of the position of the mobile station is not available, the controlling means selects the first measuring means to make it execute its measuring process.

7. The device for measuring a position of a mobile station as claimed in claim 4, wherein the controlling means selects the second measuring means with higher priority than other measuring means as long as the previous determination result of the position of the mobile station is available, and wherein when reliability of the determination result of the second measuring means is lower than a predetermined reference value and the integer solutions of integer ambiguities derived from previous determination results of the first or second measuring means are available, the controlling means selects the third measuring means to make it execute its measuring process; and when reliability of the determination result of the second measuring means is lower than a predetermined reference value and the integer solutions of integer ambiguities derived from previous determination results of the first or second measuring means are not available, the controlling means selects the first measuring means to make it execute its measuring process.

8. The device for measuring a position of a mobile station as claimed in claim 1, wherein the first measuring means measures the position of the mobile station based on observed data without using data from an inertial navigation system (INS) sensor.

9. A device for measuring a position of a mobile station, comprising:

a first measuring unit that measures the position of the mobile station based on observed data including a carrier phase of signals from satellites using a one-epoch measuring method in which only the observed data is used, independently epoch by epoch, said one-epoch measuring method performing measuring without inheriting an integer ambiguity or an error covariance from the previous epoch;

a second measuring unit that measures the position of the mobile station using a previous determination result of the position of the mobile station and speed information representative of a speed of the mobile station;

a third measuring unit that measures the position of the mobile station using solutions of variables derived from previous determination results of the first or second measuring units; and a controlling unit, implemented by a processing device, that selects one of the respective measuring units which is to execute a respective measuring process as the selected measuring unit; and reliability calculating unit that calculates reliability of the measurement result for the selected measuring unit, wherein when the calculated reliability of the measurement result of the selected measuring unit is lower than a predetermined reference value, the controlling unit selects another measuring unit as the selected measuring unit, the another measuring unit executing a respective measuring process as the selected measuring unit.

10. A method for measuring a position of a mobile station, comprising:

a first step of measuring the position of the mobile station based on observed data including a carrier phase of signals from satellites using a one-epoch measuring method in which only the observed data is used, independently epoch by epoch, said one-epoch measuring method performing measuring without inheriting an integer ambiguity or an error covariance from the previous epoch;

a second step of measuring the position of the mobile station using a previous determination result of the position of the mobile station and speed information representative of a speed of the mobile station;

a third step of measuring the position of the mobile station using solutions of variables derived from previous determination results of the first or second steps of measuring; and selecting, using a controlling unit implemented by a processing device, one of the respective measuring steps which is to execute a respective measuring process as the selected measuring step; and calculating reliability of the measurement result for the selected measuring step, wherein when the calculated reliability of the measurement result of the selected measuring step is lower than a predetermined reference value, the selecting step selects another measuring step as the selected measuring step, the another measuring step executing a respective measuring process as the selected measuring step.

* * * * *